Feb. 28, 1928.
L. F. PERILLI
1,660,395
WINDSHIELD WIPER
Filed Oct. 25, 1924
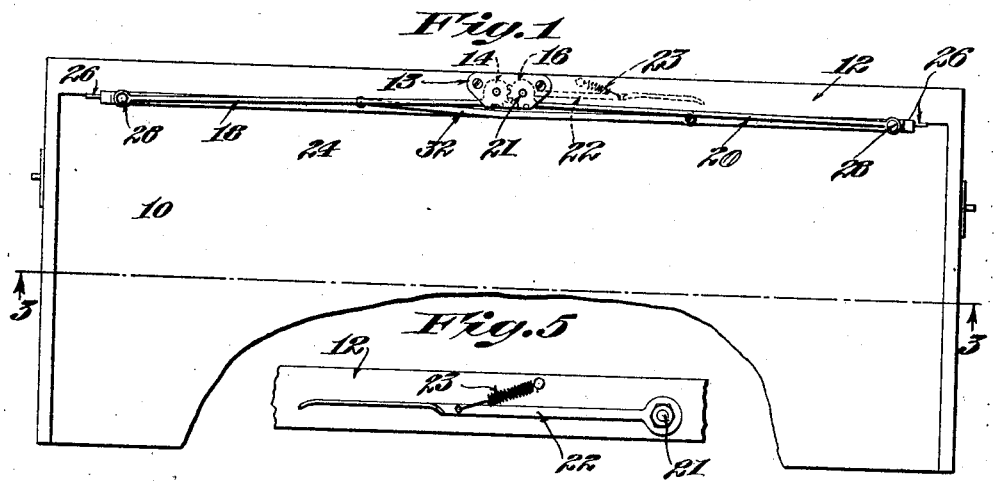
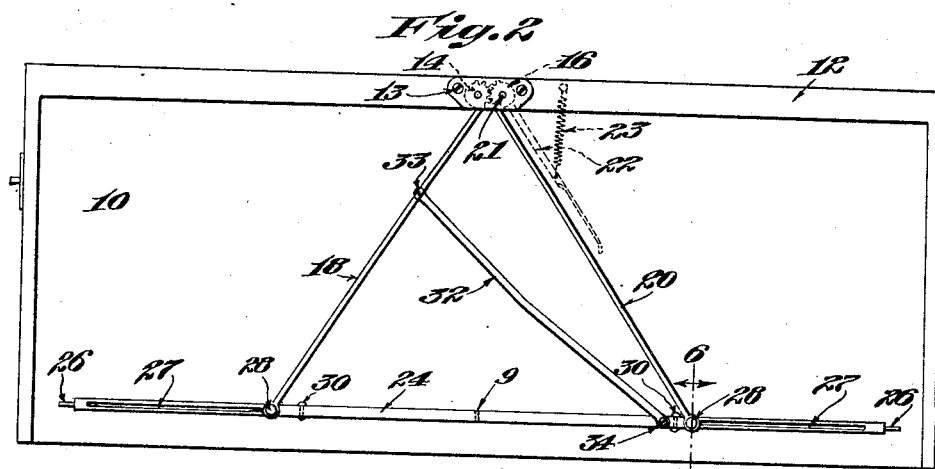
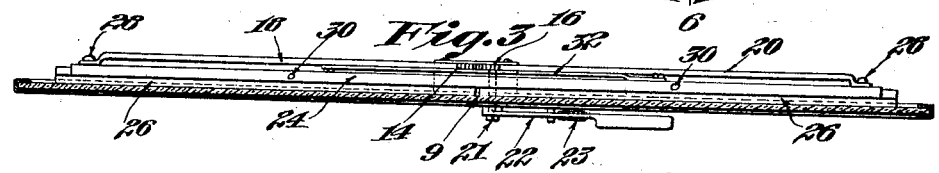
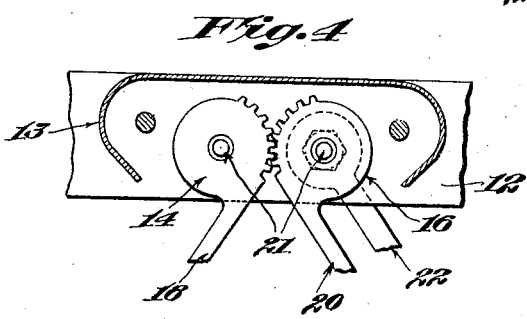
Inventor
Louis F. Perilli
by Warren G. Ogden
his Atty Patented Feb. 28, 1928.

1,660,395

UNITED STATES PATENT OFFICE.

LOUIS F. PERILLI, OF PORTSMOUTH, NEW HAMPSHIRE.

WINDSHIELD WIPER.

Application filed October 25, 1924. Serial No. 745,784.

This invention relates to wind-shield wipers for motor-cars and more particularly to that type of wind-shield cleaner that clears the glass of mist, rain or snow from one end to the other thereof.

Attempts have heretofore been made to devise a good form of a vertically movable end-to-end wind-shield cleaner but so far as the present inventor is aware none are commercially available. In designing a vertically movable end-to-end wind-shield wiper cheapness of manufacture is highly important and one way in which this may be accomplished is by employing few and simple parts so arranged that mounting on the wind-shield frame is easily accomplished. It also is highly important that the design and manner of attachment be such that there is no interference with the vision of the driver when the wiper is collapsed, or not in use, and that, when so collapsed, there are no parts which project beyond the wind-shield frame to interfere with raising the top on an open car.

The object of this invention is to provide an end-to-end wind-shield wiper having all of the features and advantages just described.

To the accomplishment of this object and such others as may hereinafter appear, as will readily be understood by those skilled in the art, the invention comprises the features and combinations of parts hereinafter described and then particularly pointed out in the appended claims.

The various features of the invention will best be understood from a description of the preferred embodiment thereof illustrated in the accompanying drawing, in which:—

Figure 1 is a view in front elevation of the wiper when collapsed at the upper edge of the wind-shield;

Fig. 2 is a view in front elevation of the wiper when extended or at the end of its down stroke;

Fig. 3 is an underside view of the wiper when collapsed;

Fig. 4 is a detail of the operating handle;

Fig. 5 is a detail of the operating gears; and

Fig. 6 is a sectional detail on the line 6—6 of Fig. 2.

In the embodiment of the invention illustrated in the drawing the upper glass pane of any motor-car wind-shield is indicated by 10, having the usual metal frame 12. Centrally of the upper reach of the frame 12 there is provided a small housing 13, secured to the frame by screws, and protecting a pair of gears 14 and 16 rotatably mounted on the frame. The roof of this housing may slope forward to clear the overhanging motor-car top. These gears are necessarily small and conveniently, although not necessarily, each may be integral with an upper end of one of a pair of depending wiper operating arms 18 and 20. The gears need not be completely formed and are illustrated as mutilated gears, the studs on which they rotate being so located that their teeth intermesh at all times.

One gear stud 21 passes through a hole drilled in the wind-shield frame and has an operating handle 22 fixed to its projecting end at the rear side of the wind shield. A coiled spring 23 is connected to normally hold the handle 22 in a horizontal position (Fig. 5) which turns the gears to a position to bring the operating arms into alignment at the upper edge of the pane of glass 10 (Fig. 1). The operating arms 18 and 20 are each slidably connected to a cleaning strip support 24 in the following manner. The support is in the form of a tube slit longitudinally at 25 to permit the rubber cleaner 26 to project therefrom (Fig. 6) and in its forward wall are two horizontal, longitudinal slots 27. A slidable bolt or rivet 28 projects horizontally from each slot and each bolt has one of the arms 18, 20 pivoted thereon.

The cleaner 26 is held within a strip of metal 29 bent into a channel, and its projecting edge bends about the metal as the wiper moves up and down over the glass. Preferably the cleaning strip is in two sections, as indicated at 9 on Figs. 2 and 3, each section being secured in the support 24 by a central, vertical pivot pin 30. This construction permits each section to rock independently and hug the glass on old wind-shields where the frame has been bent throwing the glass out of its original single plane.

A radius rod 32 has its upper end pivotally connected to one operating arm, as 18, at a point 33 generally adjacent the gear 14, and its lower end pivotally connected to the cleaning strip support 24 at a point 34 within the two slots 27. The operating arms 18 and 20 and radius rod 32 have their lower ends bent inward slightly to cause the cleaning strip to hug the glass.

The wiper is easy to operate and is effective in operation. On swinging the handle 22 downward from its position in Fig. 1 the gears 14 and 16 are rotated in directions to swing the operating arms downward, thus forcing the cleaning strip 26 down the glass. The cleaning strip support 24 is maintained horizontal during this movement by the radius rod 32 which is rotating about its pivot 34, but because of the constantly changing position of its pivoted end 33 continues to drop its end of the support 24 vertically at the same rate that the other end is dropped by the downward swing of the operating arm. Meanwhile the two bolts 28 are sliding inward on the support 24 and the construction is such that the cleaning strip is continuously firmly supported and constantly pressed against the glass. On swinging the handle 22 upward the operation just described is reversed the spring 23 aiding the movement in this direction. The pivot point 34 of the radius rod moves up and down in a right line path, while its pivot point 33 moves in an arcuate path concentric to the stud on which the gear 14 rotates, thus holding the cleaning strip horizontal as it is drawn up and down by the two operating arms 18 and 20.

The wiper is readily attached to any wind-shield, is so simple that it cannot get out of order and is easily operated by one hand of the driver.

While the particulars of construction herein set forth are well suited to one form of the invention, it is not to be understood that these particulars are essential since they may be variously modified within the skill of the artisan without departing from the true scope of the actual invention as defined by the following claims.

What is claimed as new, is:—

1. A wind-shield wiper having, in combination, a pair of intermeshing gears rotatably mounted on the upper reach of the wind-shield frame, an operating arm extending from each gear, a cleaning member extending horizontally across the wind-shield, each of said operating arms being slidably connected thereto, a radius rod connecting one of said arms to the cleaning member, and means for rotating said gears.

2. A wind-shield wiper having, in combination, a pair of intermeshing gears rotatably mounted on the upper reach of the wind-shield frame, an operating arm extending from each gear, a cleaning member extending horizontally across the wind-shield, each of said operating arms being slidably connected thereto, a radius rod positioned between said arms connected at one end to one arm adjacent its gear and at its other end to the cleaning member between said two slidable arm connections, and means for rotating said gears.

3. A collapsible wind-shield wiper comprising a cleaning member support extending horizontally across the wind-shield, two operating arms pivotally mounted centrally of the wind-shield frame and slidably connected to said support, means at the upper pivoted end of each operating arm to swing them simultaneously outward and raise said support and arms into a position of substantial alignment, and a radius rod connecting the central portion of one of said arms to the central portion of the cleaning member support whereby a constant horizontal position of said support during its travel over the wind-shield is insured.

4. A collapsible wind-shield wiper comprising a cleaning member, a pair of operating arms and an intermediate radius rod, said arms being pivotally connected to the wind-shield and slidably connected to said member and said rod being pivotally connected to one arm and to said member, said parts being mounted and arranged to lie at the upper edge of the wind-shield when collapsed with the inner ends of said arms abutting, an operative connection between said inner ends for rotating one arm from the other, and means for rotating said one arm.

5. A wind-shield wiper comprising a cleaning member extending horizontally across the wind-shield, two operating arms each pivotally connected at one end at the upper edge of the wind-shield and slidably connected at the other end to said cleaning member, a radius rod connected between one of said arms and said cleaning member, and means for swinging said operating rods about their pivotal connections.

6. A wind-shield wiper comprising a cleaning member extending horizontally across the wind-shield, two operating arms each pivotally connected at one end at the upper edge of the wind-shield and slidably connected at the other end to said cleaning member, a radius rod connected between one of said arms and said cleaning member, means connected to the pivoted ends of said operating rods for swinging said rods in opposite directions, and a common actuating device for controlling the operation of said means.

LOUIS F. PERILLI.